(12) United States Patent
Yoshimura et al.

(10) Patent No.: US 7,896,029 B2
(45) Date of Patent: Mar. 1, 2011

(54) FOUR-WAY VALVE

(75) Inventors: Susumu Yoshimura, Tokyo (JP);
Shinichi Wakamoto, Tokyo (JP); Shinji Nakashima, Tokyo (JP); Takashi Sekiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 577 days.

(21) Appl. No.: 11/722,727

(22) PCT Filed: Nov. 2, 2005

(86) PCT No.: PCT/JP2005/020175
§ 371 (c)(1),
(2), (4) Date: Jun. 25, 2007

(87) PCT Pub. No.: WO2006/075433
PCT Pub. Date: Jul. 20, 2006

(65) Prior Publication Data
US 2008/0142099 A1   Jun. 19, 2008

(30) Foreign Application Priority Data
Jan. 13, 2005  (JP) ............................. 2005-006082

(51) Int. Cl.
*F16K 11/065* (2006.01)
(52) U.S. Cl. .................. 137/625.43; 251/366
(58) Field of Classification Search ............. 137/625.43; 251/366; 165/174, 178
See application file for complete search history.

(56) References Cited

U.S. PATENT DOCUMENTS

| | | | | | |
|---|---|---|---|---|---|
| 643,732 | A | * | 2/1900 | Rhodes ........................ 91/294 |
| 2,127,073 | A | * | 8/1938 | Topping ....................... 285/41 |
| 2,164,629 | A | * | 7/1939 | Sibley ......................... 285/203 |
| 2,272,863 | A | * | 2/1942 | Young ....................... 165/134.1 |
| 4,117,883 | A | * | 10/1978 | Feldmann ................... 165/174 |
| 4,254,819 | A | * | 3/1981 | Worrell ................... 165/134.1 |
| 4,273,363 | A | * | 6/1981 | Angel ......................... 285/47 |
| 2001/0040024 | A1 | * | 11/2001 | Blanda et al. ............ 165/134.1 |

FOREIGN PATENT DOCUMENTS

| | | |
|---|---|---|
| JP | 55-49104 | 3/1980 |
| JP | 59-49104 U | 4/1984 |
| JP | 61-241571 A | 10/1986 |

(Continued)

*Primary Examiner*—John Rivell
*Assistant Examiner*—Kevin Murphy
(74) *Attorney, Agent, or Firm*—Leydig, Voit & Mayer, Ltd.

(57) ABSTRACT

In a four-way valve having a simple structure, even if a high-temperature refrigerant and a low-temperature refrigerant flow close to each other, heat loss between both refrigerants is suppressed. The valve comprises a housing member including a valve chamber, a valve seat including a bearing surface portion located in the valve chamber, a first channel through which a high-temperature fluid flows and a second channel through which a low-temperature fluid flows at a predetermined time, including openings adjacent to each other at a bearing surface portion of the valve seat, passing through the valve seat and extending outside of the valve chamber, and a valve element moving to the bearing surface portion of the valve seat. A thermal resistor portion suppressing heat transfer between these channels is located near the openings, between the first and second channels.

5 Claims, 10 Drawing Sheets

FOREIGN PATENT DOCUMENTS

| | | |
|---|---|---|
| JP | 5-6264 U | 1/1993 |
| JP | 10-160009 A | 6/1998 |
| JP | 11-166640 A | 6/1999 |
| JP | 11-201297 A | 7/1999 |
| JP | 2000-9366 A | 1/2000 |
| JP | 2002-221375 A | 8/2002 |
| JP | 2003-254453 A | 9/2003 |
| JP | 2004-092734 A | 3/2004 |

* cited by examiner

FIG. 1(a)
→ RH  FIG. 1(b)
--→ RC
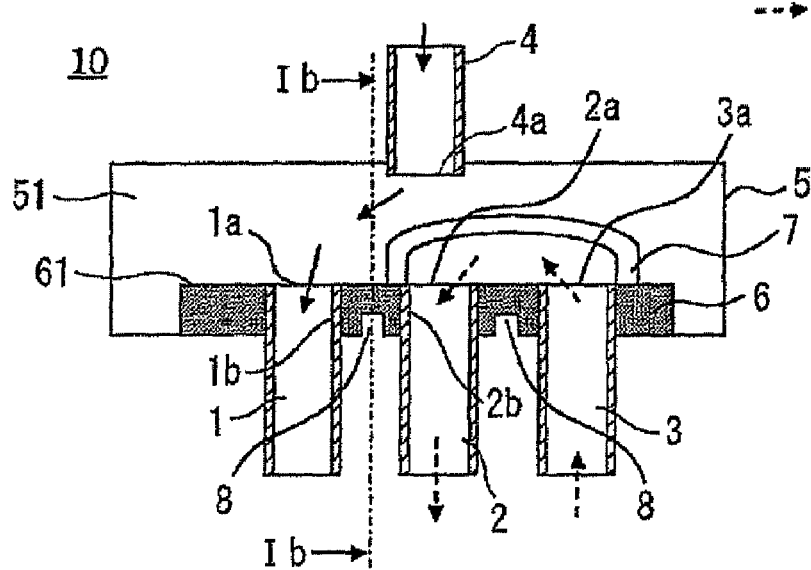
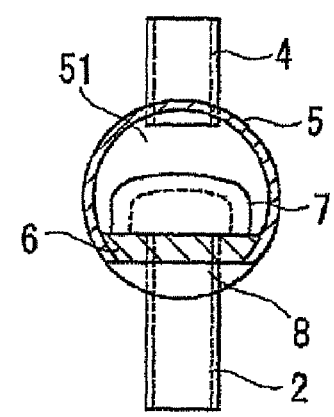

FOUR-WAY VALVE

TECHNICAL FIELD

The present invention relates to a structure of a four-way valve for use in, e.g., a switching valve for air conditioning operation in a refrigerant circuit of an air conditioner.

BACKGROUND ART

As a conventional four-way, there is the one in which at least a sliding surface with respect to a valve seat of a slide valve in a switching valve is made of self-lubricating resin, and the remaining portion except for the mentioned sliding surface of the mentioned slide valve is made of thermosetting resin or crystalline thermoplastic resin having no ester group or amino group (for example, refer to Patent Document 1).

Further, there is another one in which a body of a three-way switching valve switching a port B so as to communicate to a port A, into which a refrigerant of high temperature and high pressure is guided, or to a port D from which a refrigerant of low temperature and low pressure is guided out, and a body of a three-way switching valve switching a port C so as to communicate to a port A or a port D, are separated. Common ports A and D are connected to each other through pipes. A passage of each body in which a refrigerant flows is surrounded by a heat-insulating sleeve and a heat-insulating plug. And a plug forming a valve element is made of a material of low thermal conductivity (for example, refer to Patent Document 2).

[Patent Document 1] Japanese Patent Publication (unexamined) No. 201297/1999 (page 1, FIG. 2)

[Patent Document 2] Japanese Patent Publication (unexamined) No. 254453/2003 (page 1, FIG. 1)

DISCLOSURE OF INVENTION

Problems to Be Solved by the Invention

In the four-way valve exemplified in the above-mentioned Patent Document 1, since a refrigerant at high temperature and high pressure from a compressor outlet and a refrigerant at low temperature and low pressure flow close to each other, a heat loss due to leakage of heat between both refrigerants occurs. When any heat loss occurs, in the case of a heating mode, reduction of a heating capacity is induced. And moreover, due to that a refrigerant gas at the compressor inlet is over-heated, efficiency of the compressor is decreased, so that a problem exists in that efficiency of the whole air conditioner is largely reduced. Furthermore, in the four-way valve exemplified in Patent Document 2, although a heat loss in the internal part is suppressed, since a plug made of a material of low thermal conductivity such as resins is provided in a body, so that a problem exists in that the number of parts is increased, and a structure becomes complicated.

The present invention has been made to solve the above-mentioned problems of the prior arts. As a result of intense studies and analyses on the heat loss of a four-way valve made by the present inventors, it has been found that when high-temperature refrigerant flows in a valve chamber from an inlet channel and flows out from an outlet channel, owing to collision or contraction of the refrigerant flowing at an opening of the outlet channel a surface velocity of the refrigerant in the vicinity of the wall surface is increased, and thus a temperature boundary layer comes to be thin, eventually resulting in enhancement of heat transfer, and that the degree of enhancement of heat transfer becomes several times to several dozen times larger than that of the flow grown up in the pipe. Likewise, a heat transfer is enhanced at an outlet channel of a low-temperature refrigerant as well. As a result, it has been acknowledged that due to these two enhanced heat transfers being main factors, a heat loss between the high-temperature refrigerant and the low-temperature refrigerant occurs being concentrated between outlet channels provided in a valve chamber or at a valve seat, particularly in the vicinity of openings thereof. On the basis of these findings, the inventors came to the invention, and an object of the invention is to provide a four-way valve in a simple structure of which heat loss due to leakage of heat is less, and by which energy-saving performance of an air conditioner can be improved.

Means of Solution to the Problems

A four-way valve according to the present invention comprises a housing member including a valve chamber, a valve seat including a bearing surface portion provided in the mentioned valve chamber, a first channel acting as an outlet channel of a high-temperature fluid and a second channel acting as an outlet channel of a low-temperature fluid respectively at a predetermined time, the first channel and the second channel respectively including openings adjacent to each other on the bearing surface portion of the valve seat and each passing through the mentioned valve seat to extend to the outside of the mentioned valve chamber, and a valve element provided so as to move with respect to the bearing surface portion of the mentioned valve seat, and in which a thermal resistor portion suppressing a heat transfer between the mentioned channels is provided at a position near the mentioned openings between the mentioned first and second channels.

BRIEF DESCRIPTION OF DRAWINGS

FIGS. 1(a) and 1(b) are sectional views schematically illustrating essential parts of a four-way valve according to a first preferred embodiment of the present invention.

EFFECT OF THE INVENTION

Figure 2A:
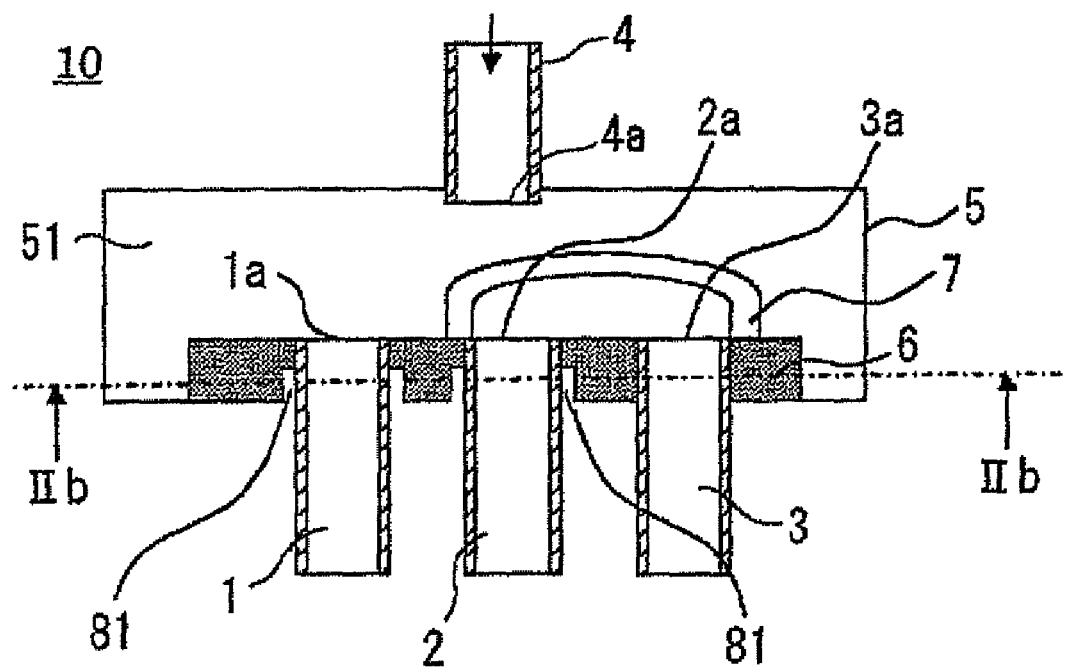
FIGS. 2(a) and 2(b) are sectional views illustrating a modification of the four-way valve illustrated in FIG. 1.

According to this invention, owing to the construction that between the two channels opening adjacent to each other at the bearing surface portion of the valve seat, a thermal resistor portion suppressing a heat transfer between these channels is provided at a position near the openings, the heat transfer is effectively interrupted, and thus heat loss is reduced. A further advantage is such that since a structure is comparatively simple, there is no increase of costs. Consequently, heating and cooling capacities are improved when used in an air conditioner and additionally, the low-temperature refrigerant flowing into the compressor is prevented from being overheated, and thus efficiency of the entire compressor is improved, resulting in improvement of energy-saving performance of the air conditioner.

BEST MODE FOR CARRYING OUT THE INVENTION

Hereinafter, the best mode for carrying out the present invention is described referring to the drawings.

Embodiment 1

Figure 2B:
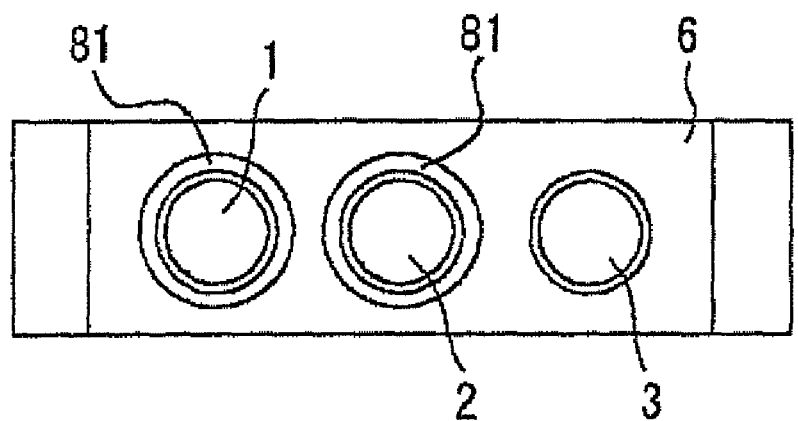
Figure 3:
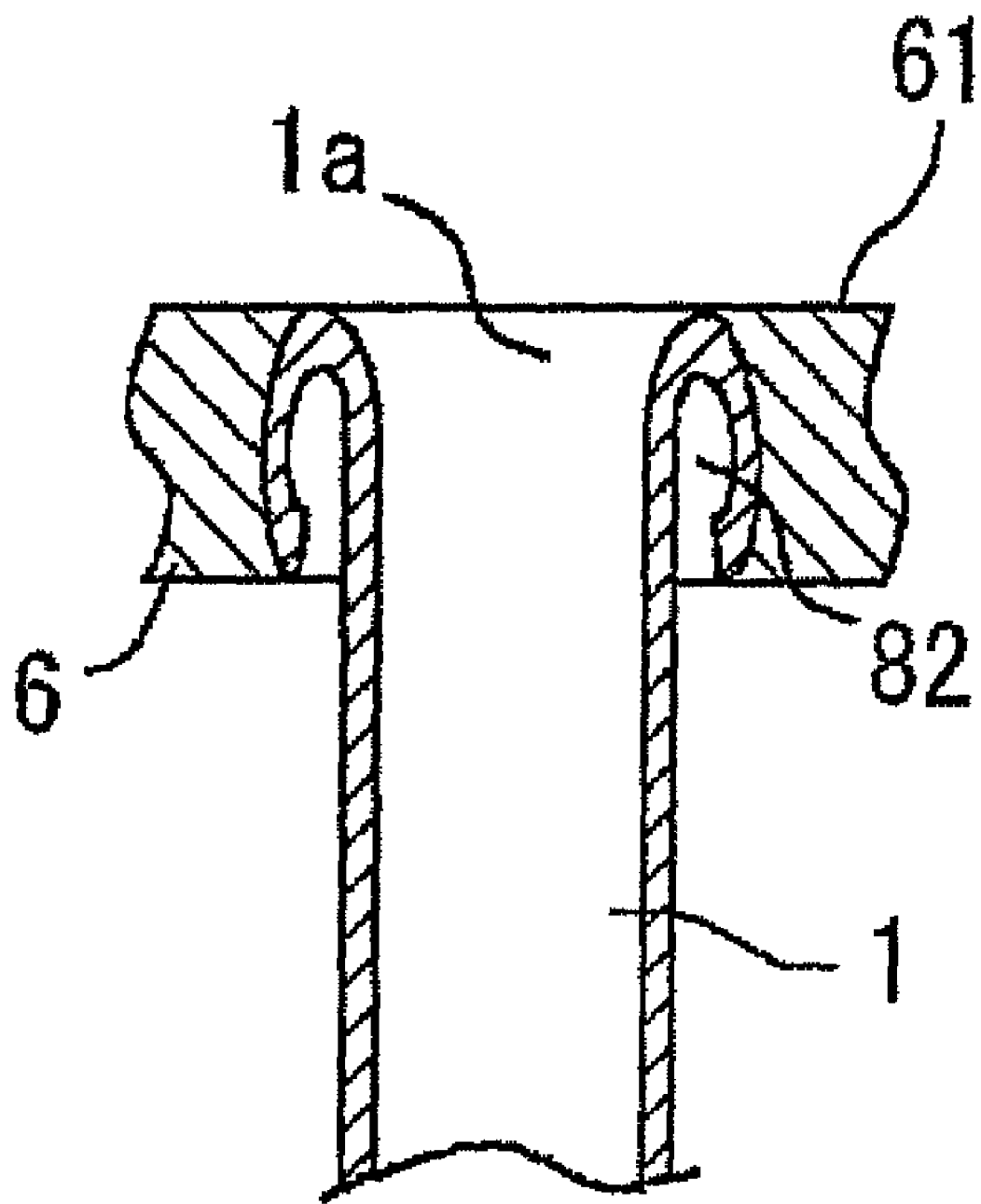
FIG. 3 is a sectional view illustrating another modification of the four-way valve illustrated in FIG. 1.
Figure 4:
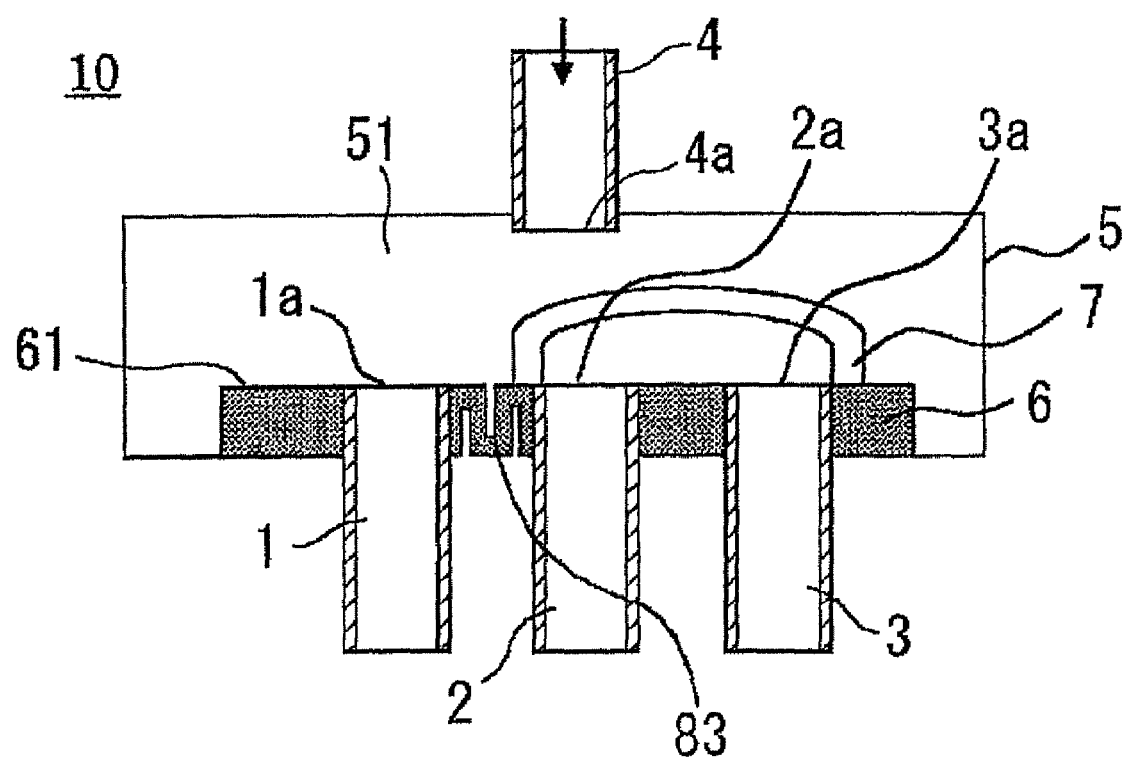
FIG. 4 is a sectional view illustrating still another modification of the four-way valve illustrated in FIG. 1.

FIGS. 1 to 4 are views each for schematically explaining essential parts of a four-way valve according to a first preferred embodiment of the present invention. FIG. 1(a) is a sectional view, and FIG. 1(b) is a sectional view taken along the line Ib-Ib of FIG. 1(a). FIG. 2 show a modification of a four-way valve of FIG. 1, and in which FIG. 2(a) is a sectional view, and FIG. 2(b) is a sectional view taken along the line IIb-IIb of FIG. 2(a). FIG. 3 is a sectional view of essential parts illustrating another modification of the four-way valve of FIG. 1. FIG. 4 is a sectional view illustrating still another modification of the four-way valve of FIG. 1.

With reference to FIG. 1, a four-way valve 10 is provided with a substantially cylindrical-shaped housing member 5 having a valve chamber 51 with two ends closed, a valve seat 6 including a bearing surface portion 61 provided in the mentioned chamber 51, a first channel 1, second channel 2 and third channel 3 each pipe shaped and including openings 1a, 2a and 3a located linearly at the bearing surface portion 61 of the valve seat 6 and adjacent to each other, and each passing through this valve seat 6 to extended to the outside of the mentioned valve chamber 51, a pipe-shaped channel 4 open to the above-mentioned valve chamber 51 and extending to the outside of the valve chamber 5, and a valve element 7 provided so as to slide with respect to the bearing surface portion 61 of the mentioned valve seat 6.

The above-mentioned valve element 7, in this first embodiment, is made employing a material of low thermal conductivity, for example, resin material. Then, this valve element 7 is constructed so as to move (slide) in a lateral direction of FIG. 1(a) in the state of being closely contacted with respect to the bearing surface portion 61 to switch channels. A driving mechanism for this switching can employ well-known conventional techniques without particular limitations, and is not directly related to a gist of the invention, so that an illustration thereof is omitted herein.

Between the mentioned first channel 1 and second channel 2, as well as between the mentioned second channel 2 and third channel 3 at the underside portion in the drawing of the mentioned valve seat 6, slit-like or groove-like cuts 8 are formed as a thermal resistor portion functioning to suppress a thermal transfer between the vicinities of the openings of these channels. Further, the mentioned first, second, third and fourth channels 1, 2, 3 and 4 are connected to an indoor heat exchanger, a compressor inlet, an outdoor heat exchanger, and a compressor outlet respectively, their illustration being omitted, and form a refrigerant circuit of a heat pump-type air conditioner Solid line arrows RH indicate the flow of a high-temperature refrigerant that is fluid, and broken line arrows RC indicate the flow of a low-temperature refrigerant that is fluid. Furthermore, the mentioned valve element 7, at a position illustrated in FIG. 1(a), communicates the fourth channel 4 and the first channel 1 to each other, and on the other hand, communicates the second channel 2 and the third channel 3 to each other, to divide an internal part of the valve chamber 51 into two channels being one channel in which a high-temperature refrigerant RH flows and the other channel in which a low-temperature refrigerant RC flows. In this example, a refrigerant circuit arrangement of a heating mode is shown. In addition, throughout the drawings, the same reference numerals indicate the same or like parts.

Now, operations of the mentioned first embodiment arranged as illustrated in FIG. 1 are described. The high-temperature refrigerant RH discharged from a compressor outlet, of which illustration is omitted, flows from the fourth channel 4 into the valve chamber 51, and through the first channel 1, fed to an indoor heat exchanger. The low-temperature refrigerant RC having passed and returned through the outdoor heat exchanger connected in series to the mentioned indoor heat exchanger via an expansion valve, of which illustration is omitted, flows from the third channel 3 into the valve element 7. Then, the low-temperature refrigerant RC is U-turned in the valve element 7, and circulated so as to flow out to the outside from the second channel 2 and to return to a compressor inlet. Thus, an operation in the heating mode is performed. Meanwhile, by sliding the valve element 7 to the left of FIG. 1(a) in the state of being closely contacted with the bearing surface portion 61, the channels are switched such that the first channel 1 and the second channel 2, and the third channel 3 and the fourth channel 4 are respectively communicated, thereby being switched to a refrigerant circuit arrangement in a cooling mode, in which the high-temperature refrigerant RH is fed from the fourth channel 4 through the third channel 3 to the outdoor heat exchanger, and the low-temperature refrigerant RC from the indoor heat exchanger is fed from the first channel 1 through the second channel 2 and returned to the compressor inlet.

In the four-way valve 10, since the high-temperature refrigerant RH and the low-temperature refrigerant RC flow close to each other as described above, a heat loss due to the leakage of heat occurs between both refrigerants. In this regard, the heat loss in the four-way valve is analyzed in further detail as follows. That is, as for the case of a heating mode, the high-temperature refrigerant RH having flowed in from the fourth channel 4 is collided with the opening 1a of the first channel 1, being an outlet channel, as a jet stream. Therefore, first at the opening 1a of the first channel 1 and on the wall surface 1b where the high-temperature refrigerant RH has just flowed out in the vicinity of the opening, a surface velocity of the refrigerant in the vicinity of the wall surface 1b is increased due to the collision or contraction of refrigerant flow. Thus, a temperature boundary layer comes to be thinner, and a heat transfer is enhanced.

On the other hand, the low-temperature refrigerant RC having flowed in from the third channel 3 is U-turned in the valve element 7 to flow out from the second channel 2. Therefore, the flow comes off before flowing out from the second channel 2 to approach to the outer circumferential side, a surface velocity of the refrigerant in the vicinity of the channel wall surface 2b proximate to the opening 2a is increased, and thus likewise a heat transfer is enhanced. The degree of this heat transfer being enhanced is several times to several dozen times larger than that of the flow being grown up in the pipe. Thus, a heat loss between the high-temperature refrigerant and the low-temperature refrigerant, with this enhanced heat transfer being a main factor, occurs being centralized between the first channel 1 and the second channel 2, that is, in the vicinity of the openings 1a and 2a of the outlet channels of the high-temperature refrigerant and the low-temperature refrigerant. Furthermore, for the same reasons, in the case of the cooling mode, a heat loss occurs being centralized in the vicinity of the openings 2a and 3a between the second channel 2 and the third channel 3.

In this first embodiment, a slit-like cut 8 between the first channel 1 and the second channel 2 is provided. The slit-like cut 8 is formed in a direction crossing the direction of heat transfer between the first and the second channels 1 and 2 being a main path of the heat loss. Therefore, a thin portion of the valve seat 6 due to the provision of this cut 8 forms a thermal resistor portion with respect to the transfer direction of heat, and thus the heat transfer is effectively interrupted. As a result, the heat loss in the four-way valve 10 is reduced resulting in improvement in heating and cooling performances. Furthermore, since the refrigerant gas at the compressor inlet can be prevented from being over-heated, working efficiency of the compressor is improved, and thus energy saving performance of the air conditioner is largely improved. Furthermore, since the mentioned advantageous effects can be obtained with such a comparatively simple structure as provision of a slit-like cut 8 in a main path of heat loss, there is a further advantage of no increase of costs.

In addition, it is preferable that, for example, as illustrated in a modification of FIG. 2, the slit-like cut 8 acting as a thermal resistor portion is formed into a cut 81 of an annular concave provided coaxially with a cross-sectional shape of a channel at the peripheral portion of the first channel 1 and the second channel 2. Further, it is preferable that, for example, as illustrated in another modification of FIG. 3, the slit-like cut 8 acting as a thermal resistor portion is formed into a chambered air layer 82 by bending outward an end portion of a pipe member forming a channel. In the case of the annular cut 81 (FIG. 2), since a heat from the channels can be prevented from being diffused and spread in the valve element 7 and the valve seat 6, a heat transfer between the channels is suppressed further, resulting in improvement in heating and cooling performances and improvement in energy saving performance of the air conditioner. Furthermore, also in the case of forming the chambered air layer 82 (FIG. 3), likewise a heat transfer between the channels is suppressed still further, and thus the diffusion of heat due to thermal conduction in the valve seat 6 or the valve chamber 51 can be suppressed, resulting in still further reduction of heat loss.

Additionally, it is preferable that these cuts 8 and 81 are formed on the side of the bearing surface portion 61 of the valve seat 6. Furthermore, as illustrated in a still further modification of FIG. 4, cuts 83 acting as a thermal resistor portion may be formed alternately on both inside and outside of the valve seat 6. In this case, as compared with the case where the cut 8 is formed only on one side as illustrated in FIG. 1, a frexural rigidity is improved when comparing in the same cut width (slit width), so that the reliability of strength is increased. Moreover, when comparing in the same frexural rigidity, a cut width (slit width) can be made wider, so that a heat transfer between the channels can be reduced further.

In the mentioned examples illustrated in FIGS. 1 to 4, the thermal resistor portion provided in the proximity of the opening of a channel is any one of the linear slit-like cut 8, 83, annular cut 81, chambered air layer 82 and the like. The thermal resistor portion can be made of a material having low thermal conductivity, for example, stainless steel, ceramics, or hard resins. And the same heat insulation effect can be obtained. Furthermore, although an example in which three channels are connected to the valve seat 6 is shown in this first embodiment, it is a matter of course that the number of channels or the type of valves that are provided at the valve seat 6 are not particularly limited, and irrespective of the number or the type thereof, the same heat insulation effect can be obtained. Additionally, by manufacturing the housing member 5 forming the valve seat 6 and the valve chamber 51 with the use of the mentioned exemplary material of low thermal conductivity, the heat loss is reduced further. Further, in combination with using any material of a large strength, an effect of reducing a heat loss due to thinning of the wall of housing member 5 can be further obtained.

Embodiment 2

Figure 5:
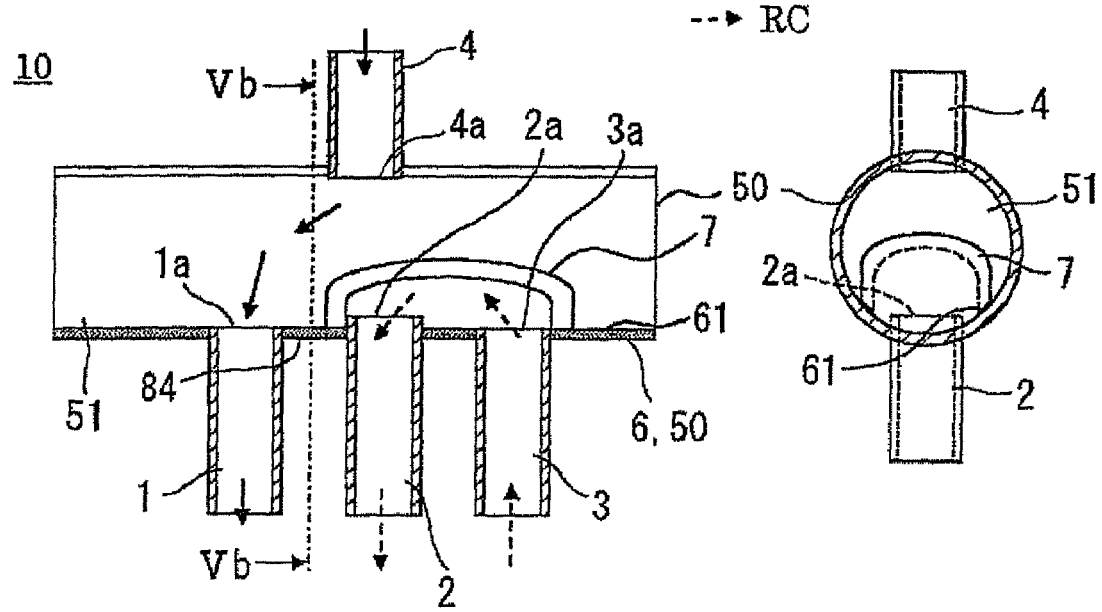
FIGS. 5(a) and 5(b) are sectional views schematically illustrating essential parts of a four-way valve according to a second embodiment of the invention.

FIG. 5 are views each schematically explaining essential parts of a four-way valve according to a second embodiment of this invention, and in which FIG. 5(a) is a sectional view, and FIG. 5(b) is a sectional view taken along the line Vb-Vb of FIG. 5(a). Referring to the drawings, a housing member 50 is constructed integrally with a valve seat 6, with a bearing surface portion 61 formed into a circular arc shape in cross section of the valve seat 6 at the lower portion of an inner circumferential surface forming a valve chamber 51, and the housing member 50 is substantially cylindrical shaped entirely in a thin structure with both ends thereof closed. A valve element 7 is formed to curve at a matching surface in conformity with the shape of the bearing surface portion 61 of the valve seat 6. A second opening 2a of the second channel 2 is provided so as to protrude in the valve chamber 51 further than the bearing surface portion 61, and functions as a stopper that restricts the rotation of the valve element 7. Reference numeral 84 designates a thermal resistor portion made of a thin member that is formed of the valve seat 6 (also serving as the housing member 50). The other construction is the same as in the above-mentioned first embodiment, so that further descriptions thereof are omitted.

In the second embodiment constructed as mentioned above, the valve seat 6 is formed of a thin member integrally with the housing member 50, so that this valve seat 6 forms a thermal resistor portion 84 between the channels in the proximity of the openings 1a and 2a of the first channel 1, being an outlet channel of a high-temperature refrigerant RH, and the second channel 2, being an outlet channel of a low-temperature refrigerant RC, or at the time of cooling, in the proximity of the openings 3a and 2a of the third channel 3, being an outlet channel of a high-temperature refrigerant RH, and the second channel 2, being an outlet channel of a low-temperature refrigerant RC, to suppress a heat transfer, thus enabling to obtain the same effect as the thermal resistor portion 82 formed of the slit-like cut 8, 81, 83, or the chambered air layer in the above-mentioned first embodiment.

Embodiment 3

Figure 6:
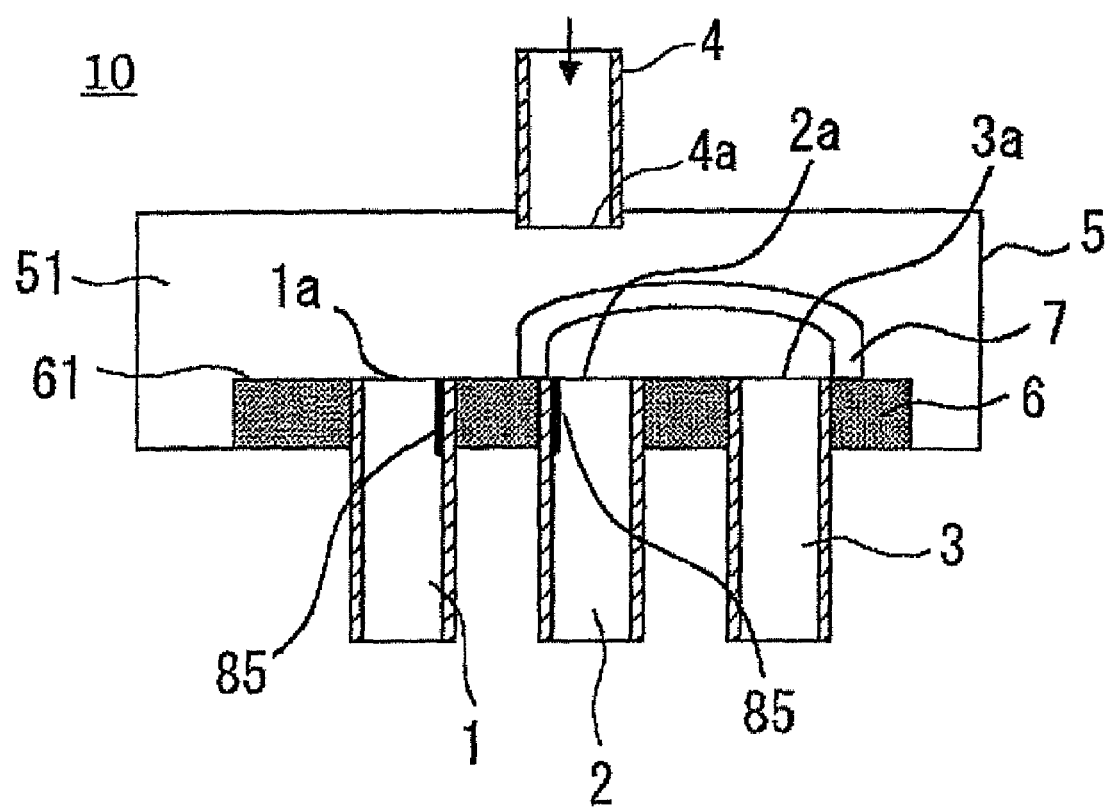
FIG. 6 is a sectional view schematically illustrating essential parts of a four-way valve according to a third embodiment of the invention.

FIG. 6 is a sectional view schematically illustrating essential parts of a four-way valve according to a third embodiment of this invention, Referring to the drawing, coating layers 85 are applied onto channel wall surfaces in the vicinity of the openings 1a and 2a of the first channel 1 and the second cannel 2, to function as a thermal resistor portion. This coating layer 85 preferably is formed of a material of low thermal conductivity of, for example, approximately 0.1 W/mK such as resin material, and is approximately 0.1 to 1 mm in film thickness. In this third embodiment, since the thermal resistor portion is a coating layer of low thermal conductivity instead of a slit-like cut, and other constructions are the same as those in the above-mentioned first embodiment, so that further descriptions thereof are omitted.

In the third embodiment constructed as mentioned above, in the heating mode, for example, an enhanced heat transfer between the first channel 1 and the second channel 2, that is, on a channel wall surface in the vicinity of the openings 1a and 2a being an outlet channel of a refrigerant, is a main factor of heat loss. Since a coating layer 85 of low thermal conductivity is applied to this position, this coating layer 85 acts as a heat-insulating barrier, and thus the heat transfer between the adjacent first and second channels 1 and 2 is effectively interrupted. As a result, the heat loss of the four-way valve 10 can be largely reduced, and thus energy saving performance of the air conditioner is significantly improved. Furthermore, since the heat-insulating barrier can be provided by a comparatively simple method, simplification of the structure can be achieved. In addition, although the coating layer 85 is applied to a part of the channel wall surface in the vicinity of the openings 1a and 2a between the first channel 1 and the second channel 2 in FIG. 6, it is preferable that the coating layer 85 is provided on the entire inner circumferential surface in the vicinity of the openings 1a and 2a of these channels as a matter of course. Further, in case of provision of a coating layer also in the proximity of the opening 3a of the third channel 3, the advantage of reducing the heat loss can be obtained in both cooling mode and heating mode.

Embodiment 4

Figure 7A:
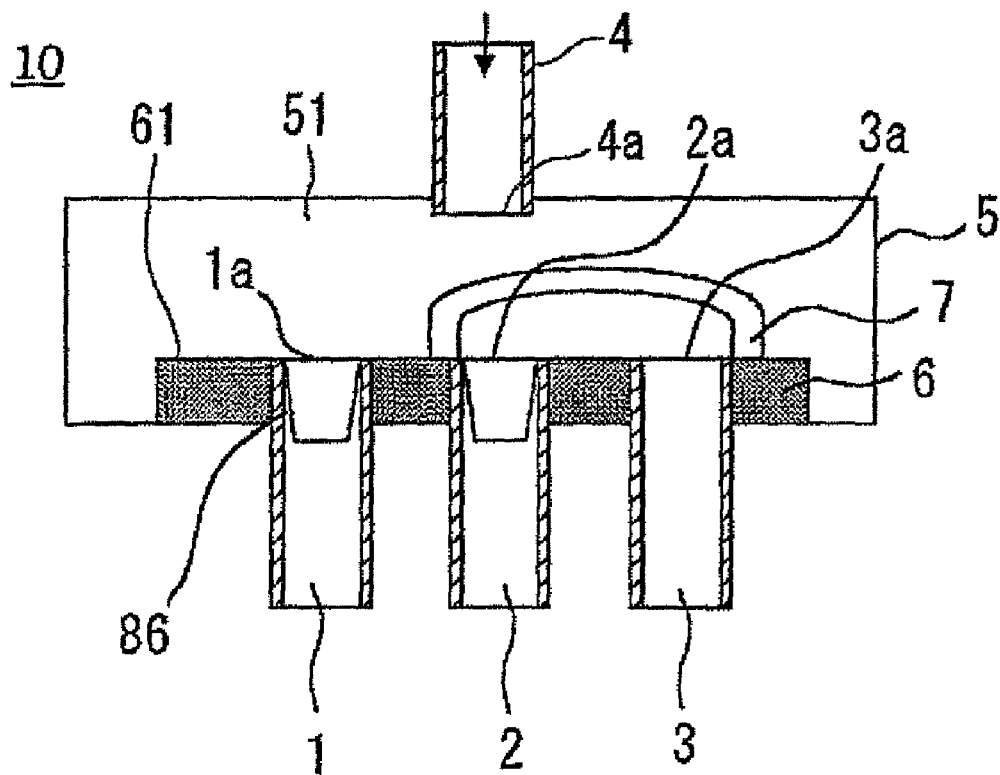
FIGS. 7(a) and 7(b) are sectional views schematically illustrating essential parts of a four-way valve according to a fourth embodiment of the invention.
Figure 7B:
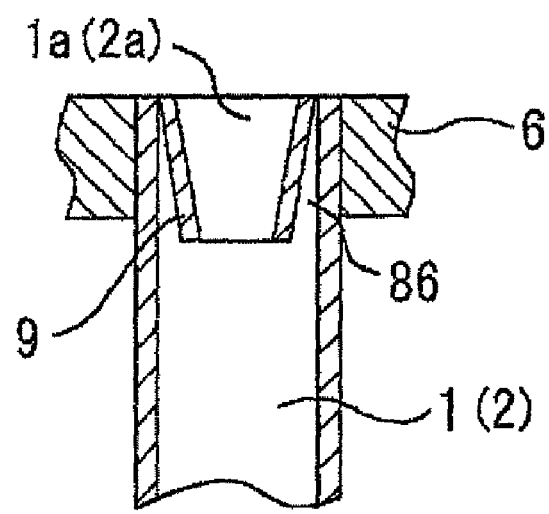

FIGS. 7 and 8 schematically explain essential parts of a four-way valve according to a fourth embodiment of this invention. FIG. 7(a) is a sectional view, and FIG. 7(b) is an enlarged view illustrating details in the proximity of an opening. FIG. 8 are sectional views of essential parts illustrating a modification (a) and another modification (b) of the four-way valve of FIG. 7.

With reference to FIG. 7, a gas retention layer-forming member 9 is formed into a tapered funnel shape for forming a gas retention layer 86 acting as a thermal resistor portion. An upper portion in the drawing of a larger diameter of the gas retention layer-forming member 9 is press-fitted and secured into the opening 1a or 2a of the first channel 1 or the second channel 2, and a lower portion in the drawing of a smaller diameter is spaced apart from the channel wall surface to be open on the central portion side in the first channel 1 and the second channel 2.

Figure 8A:
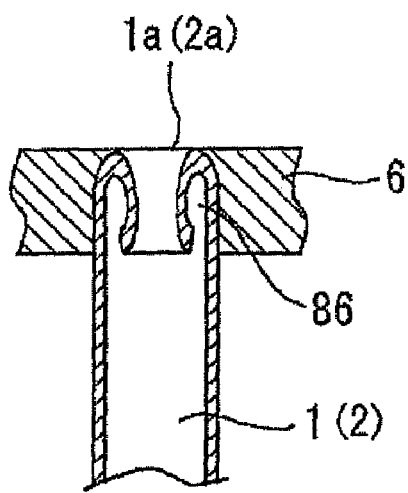
FIGS. 8(a) and 8(b) are sectional views of essential parts illustrating a modification (a) and another modification (b) of the four-way valve illustrated in FIG. 7.

In this fourth embodiment, instead of the coating layer illustrated in FIG. 6, there is provided in the above-mentioned area a gas retention layer 86 where gas (refrigerant gas) remains retained. Due to low thermal conductivity of the gas, the same heat insulation effect as that of the coating layer can be obtained. Further, it is preferable that the gas retention layer 86, as illustrated in a modification of FIG. 8(a), is made of a chambered pipe by bending a pipe end portion inward. Furthermore, as illustrated in another modification of FIG. 5Q), it is preferable using a double pipe composed of outer pipe forming the first channel 1 (the second channel 2) and inner pipe, diameter of inner pipe is smaller than that of outer pipe 1c (2c). The inner pipe is mounted with a gap being held so that the gap portion between these inner pipe 1c (2c) and outer pipe serves as a gas retention layer 86. In such a construction, the same advantage can be obtained.

Figure 8B:
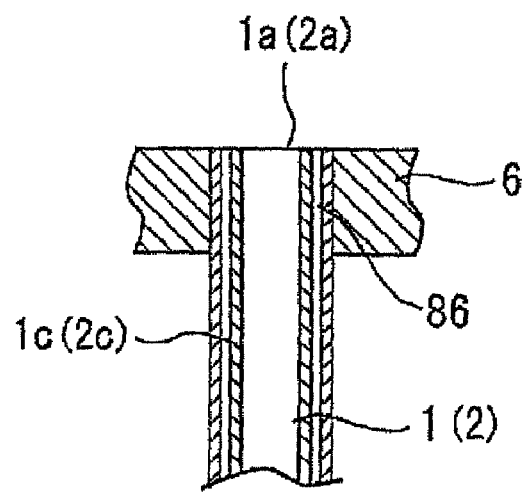

Although no holding portion of the inner pipe 1c (2c) is illustrated in FIG. 8(b), holding means of this inner pipe 1c (2c) is not particularly limited. For example, the inner pipe is fixed only at the lower end portion in the drawing, and may be free as illustrated in FIG. 8(b) at the upper end portion of the opening 1a (2a) side. Moreover, the gas retention layer 86 may be open to a valve chamber, or not open thereto. Even if the upper end portion thereof is open to the valve chamber as illustrated in FIG. 8(b), the gap between the inner pipe and the outer pipe is narrow, so that a refrigerant is less likely to flow. This gap portion can be regarded substantially as a retention layer, in comparison with the flow in the inner pipe 1c (2c). Further, it is a matter of course that the gas retention layer 86 may be provided in the opening 3a of the third channel 3. Thus, since the gas retention layer 86 has low thermal conductivity, as compared with a material, for example, copper forming the first to third channels 1 to 3, there is an advantage of heat insulating effect. In addition, since the heat-insulating barrier can be provided by a comparatively simple method, the simplification of structure can be achieved.

Embodiment 5

Figure 9:
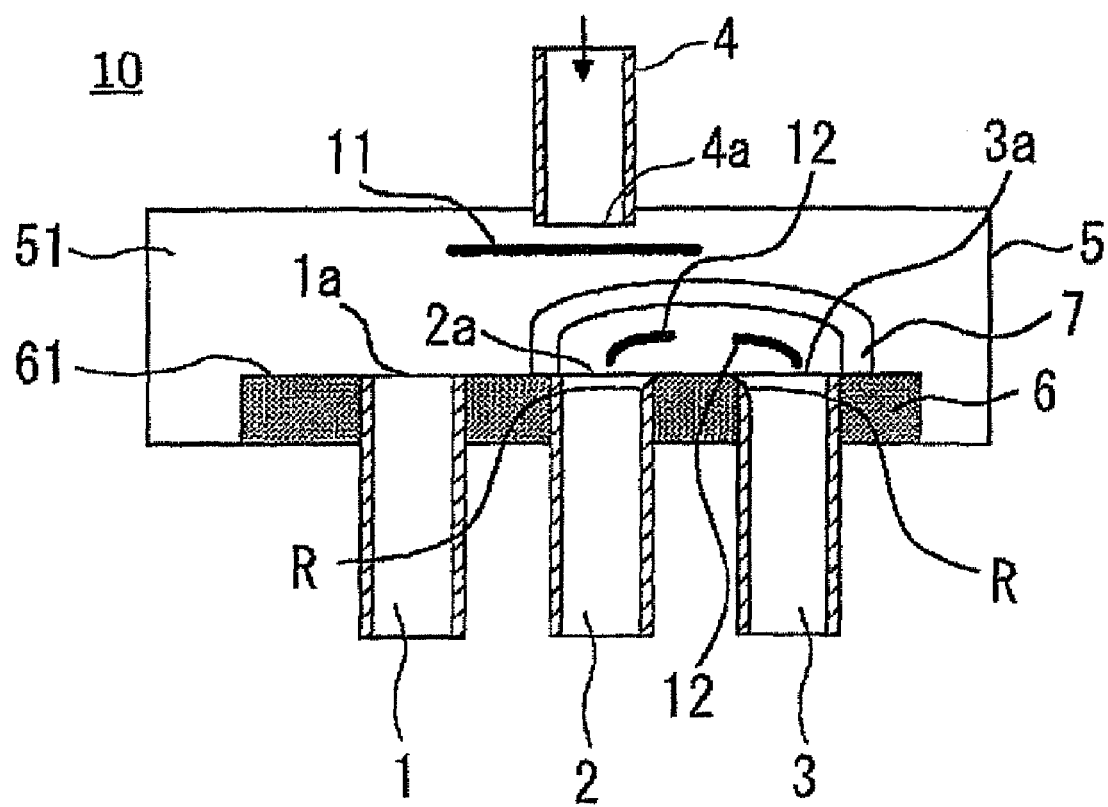
FIG. 9 is a sectional view schematically illustrating essential parts of a four-way valve according to a fifth embodiment of the invention.

FIG. 9 is a sectional view schematically illustrating essential parts of a four-way vale according to a fifth embodiment of this invention. In the drawing, in the valve chamber 51, a baffle board 11 causing a high-temperature refrigerant, being a fluid having flowed in from the fourth channel to collide and diffuse in the valve chamber 51 is provided and secured by fastening means (not illustrated) to a housing member 5. Furthermore, in an internal part of a valve element 7 straightening vanes 12 bent smoothly along a flowing direction of the refrigerant is provided and secured by fastening means (not illustrated) to the valve element 7. A corner portion R of the openings 2a and 3a between the second channel 2 and the third channel 3 is formed to be curved arc-shaped, and a channel cross section becomes larger by degrees toward the valve chamber 51.

In the heating mode, for example, in the vicinity between the opening 1a of the first channel 1, being an outlet channel and the opening 2a of the second cannel 2, a drift current or a contracted flow of the refrigerant occurs due to collision or bending of the refrigerant, shrinkage of channel area and the like, and thus a surface velocity of the refrigerant in the vicinity of the channel wall surface is increased, whereby a heat transfer is made further, which is a main factor of heat loss. However, in this fifth embodiment constructed as described above, with the baffle board 1, the refrigerant is prevented from being directly collided with the opening 1a of the first channel 1. Furthermore, when a low-temperature refrigerant having flowed in from the third channel 3 is U-turned to flow out to the second channel 2, since the corners of the openings 3a and 2a are arc-shaped and a channel area becomes larger by degrees toward the valve chamber 51, the break away of the flow is suppressed to come off. In addition, since the flow is straightened by a straightening effect of the straightening vanes 12 in the valve element 7, there is no increase of surface velocity of the refrigerant in the vicinity of the wall surface, and thus, a heat transfer enhancement is suppressed.

As described above, according to the fifth embodiment, in the heating mode, for example, there is no surface velocity of the refrigerant in the vicinity of the opening 1a or 2a of the first channel 1 or the second channel 2, being an outlet channel, the heat transfer is suppressed, and thus the heat transfer is effectively interrupted, resulting in reduction of the heat loss. Therefore, heating and cooling capacities are improved, and further, a low-temperature refrigerant to flow in a compressor is prevented from being over-heated to improve efficiency of the compressor, resulting in a considerable improvement in energy saving performance of the air conditioner. Additionally, the straightening vanes 12 disposed in an internal part of the valve element 7 are moved along with the valve element 7 when the valve element 7 is slid to the left in the drawing at the time of the cooling operation as a matter of course. Furthermore, to suppress the heat transfer at the time of cooling operation, it is preferable that the opening 1a of the first channel 1 is arc-shaped as well as the opening 2a. Moreover, even if either the mentioned baffle board 11 or the straightening vanes 12 is provided alone, a corresponding effect can be obtained. Furthermore, by provision of thermal resistor portion in the form of a cut, an air layer, a thin member, a gas retention layer, a coating layer or the like as shown in the mentioned first to fourth embodiments at the valve seat 6, a further increase of the advantages can be achieved.

Embodiment 6

Figure 10:
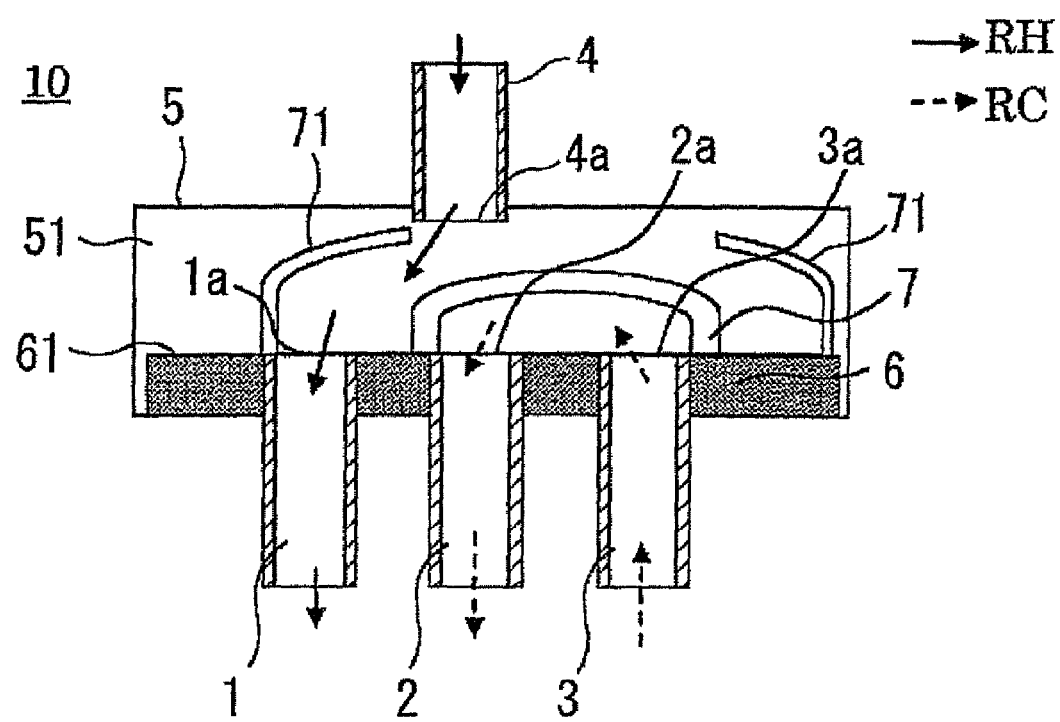
FIG. 10 is a sectional view schematically illustrating essential parts of a four-way valve according to a sixth embodiment of the invention.

FIG. 10 is a sectional view schematically illustrating essential parts of a four-way valve according to a sixth embodiment of this invention. In the drawing, a valve element 7 is in a double structure formed of an inside valve element 7 of the same shape as the above-mentioned first embodiment, and a straightening member 71 disposed outside thereof. The outside straightening member 71 is open at the top, and forms a passage guiding a high-temperature refrigerant having flowed in from the fourth channel 4 to the first channel 1 (in the heating operation) or the third channel 3 (in the cooling operation).

According to this sixth embodiment constructed as mentioned above, in the same manner as in the fifth embodiment, in the heating mode, for example, due to that the straightening member 71 is provided extending to the proximity of the opening 4a, the refrigerant is prevented from directly colliding with an inner wall of the valve chamber 51 or the opening 1a of the first channel 1. Furthermore, since the flow is straightened in a passage formed by the outside straightening member 71, there is no increase of surface velocity of the refrigerant in the vicinity of the wall surface proximate to the opening 1a of the first channel 1, being an outlet channel, and thus the heat transfer is suppressed from enhancement. In addition, when the valve element 7 is slid to the left in the drawing on the bearing surface portion 61 to come into the cooling mode, since the straightening member 71 is also moved to the left side as a matter of course, the refrigerant having flowed in from the fourth channel 4 is passed between the peripheral portion of the valve element 7 and the straightening member 71 to be guided to the third channel 3, so that the effect of suppressing the enhanced heat transfer can be obtained in the same manner as is in the heating mode. In this manner, heat transfer is effectively interrupted, and heat loss is reduced, resulting in improvement in heating and cooling performances. In addition, the low-temperature refrigerant to flow into the compressor is prevented from being over-heated to improve the efficiency of the compressor, resulting in considerable improvement in energy saving performance of the air conditioner.

Additionally, in the description of the above-mentioned embodiments, a four-way valve is taken as an example, and in which openings of three channels are linearly formed in alignment at the bearing surface portion 61 of the valve seat 6 disposed in the valve chamber 51, a fluid of high temperature is made to flow into the valve chamber 51, and the valve element 7 is slid and moved in sliding contact with the bearing surface portion 61. It is, however, a matter of course that the four-way valve according to invention is not to limited to such type or example. Furthermore, it will be easy to construct into any other type of four-way valve in combination with a plurality of constructions described in respective embodiments, for example, a cut is preferably provided in the vale seat 6 illustrated in FIG. 10. In the case of combining a plurality of constructions, a heat-insulating effect can be enhanced all the more. In addition, although the cut 8, 83 is described as an example of being provided in a slit-like fashion, the shape is not limited to be slit-like. For example, even if it is a V-shaped or U-shaped groove, the same effect can be achieved.

INDUSTRIAL APPLICABILITY

A four-way valve according to the present invention is applied to a switching valve for air conditioning operation in a refrigerant circuit, for example, of a heat pump-type air conditioner.

The invention claimed is:

1. A four-way valve comprising:
a housing member including a valve chamber;
a valve seat having a thickness and including a bearing surface portion located in said valve chamber;
a first channel having an inside surface and acting as an outlet channel of a high-temperature fluid and a second channel having an inside surface and acting as an outlet channel of a low-temperature fluid, respectively, at a predetermined time, said first and second channels
including openings adjacent to each other on said bearing surface portion of said valve seat, and
passing through the thickness of said valve seat and extending outside of said valve chamber;
a valve element that is movable with respect to said bearing surface portion of said valve seat; and
a thermal resistor portion suppressing heat transfer between said first and second channels and located proximate the openings of said first and second channels, wherein
said thermal resistor portion includes at least one gas retention layer-forming member having a ring shape and located on said inside surface of at least one of said first and second channels, proximate the openings of at least one of said first and second channels, and at least partially spaced from said inside surface of the corresponding channel so that a gas retention layer is formed between said gas retention layer-forming member and said inside surface of the respective channel, within the thickness of said valve seat, and
each of the gas retention layer-forming members has a tapered funnel shape, having a larger diameter at a first end, the first end contacting the inside surface of the respective channel, at the opening of the respective channel, and a smaller diameter at a second end, the second end being spaced from the inside surface of the respective channel so that only the first end of the respective gas retention layer-forming member contacts the inside surface of the respective channel.

2. The four-way valve according to claim 1, wherein each of the gas retention layer-forming members is open to the valve chamber.

3. A four-way valve comprising:
a housing member including a valve chamber;
a valve seat having a thickness and including a bearing surface portion located in said valve chamber;
a first channel having an inside surface, a second channel having an inside surface, and a third channel having an inside surface, said first, second, and third channels including respective openings adjacent to each other in said bearing surface portion of said valve seat, and passing through the thickness of said valve seat and extending outside of said valve chamber;

a fourth channel openable toward a valve chamber of said housing member for inward flow of a fluid at high temperature;

a valve element that is movable with respect to said bearing surface portion of said valve seat, and switching said first, second, third, and fourth channels such that when a fluid at high temperature that has flowed in from said fourth channel is made to flow out to said first channel, a fluid at low temperature that has flowed in from said third channel is made to flow out to said second channel, and when a fluid at high temperature that has flowed in from said fourth channel is made to flow out to said third channel, a fluid at low temperature that has flowed in from said first channel is made to flow out to said second channel; and a thermal resistor portion suppressing heat transfer between said first, second, third, and fourth channels and located proximate each of the openings of said first and second channels, wherein said thermal resistor portion includes at least one gas retention layer-forming member having a ring shape and located on said inside surface of at least one of said first and second channels, proximate the openings of at least one of said first and second channels and at least partially spaced from said inside surface of the corresponding channel, so that a gas retention layer is formed between said gas retention layer-forming member and said inside surface of the respective channel, within the thickness of said valve seat, and each of the gas retention layer-forming members has a tapered funnel shape, having a larger diameter at a first end, the first end contacting the inside surface of the respective channel, at the opening of the respective channel, and a smaller diameter at a second end, the second end being spaced from the inside surface of the respective channel so that only the first end of the respective gas retention layer-forming member contacts the inside surface of the respective channel.

4. The four-way valve according to claim 3, further comprising a gas retention layer-forming member having a ring shape and located on said inside surface, proximate the opening, of said third channel.

5. The four-way valve according to claim 3, wherein each of the gas retention layer-forming members is open to the valve chamber.

* * * * *